No. 792,423.                                    Patented June 13, 1905.

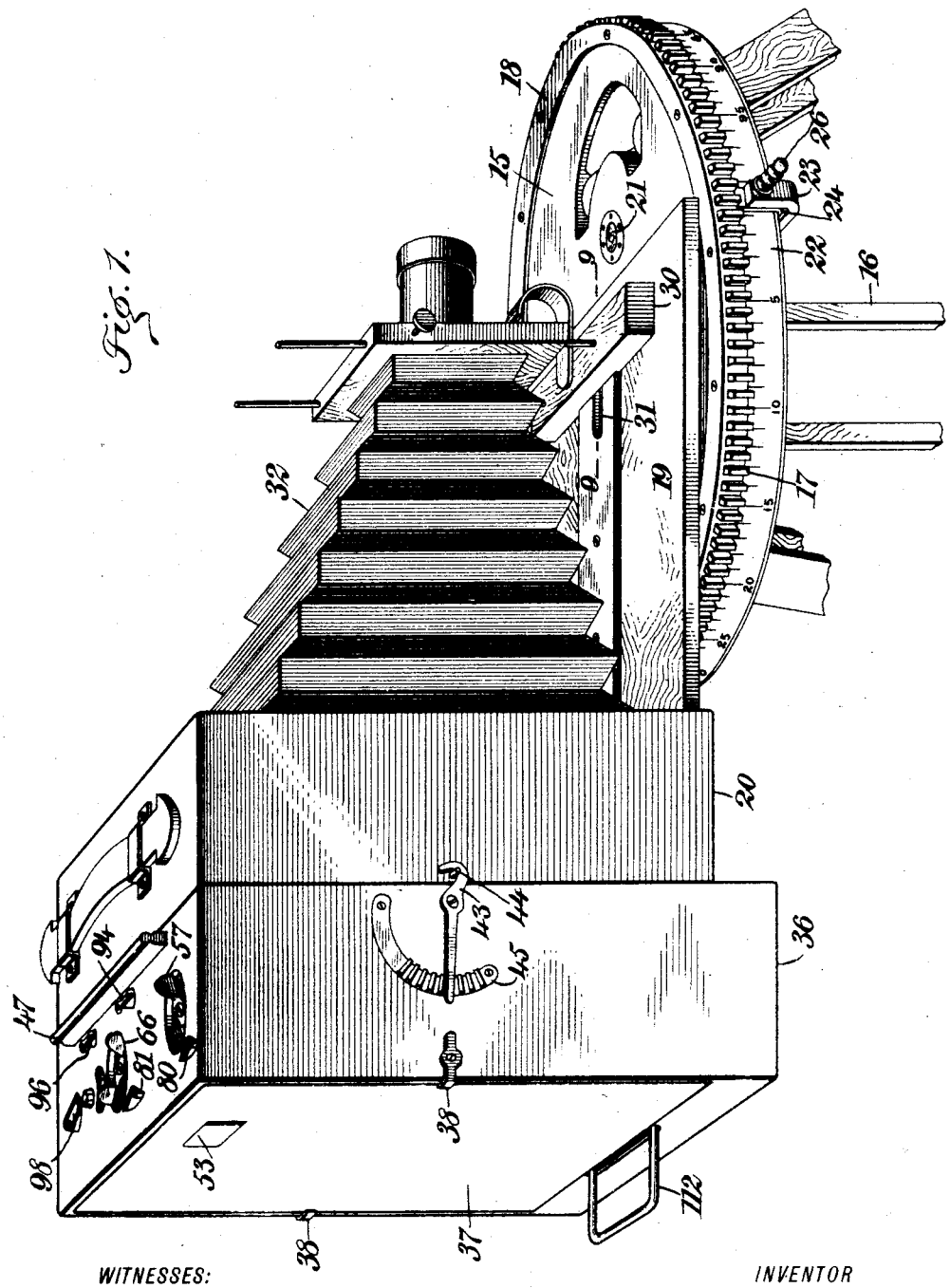

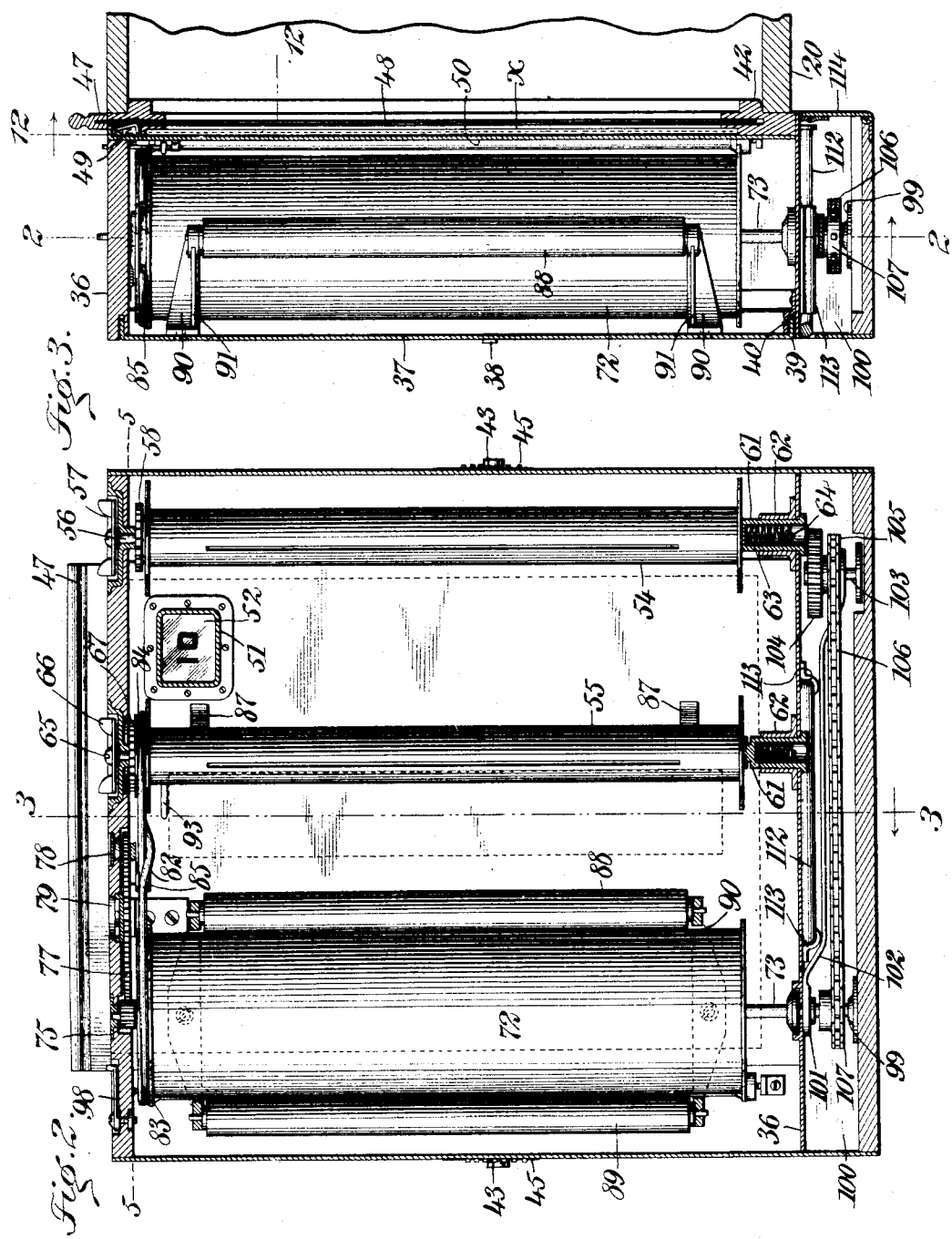

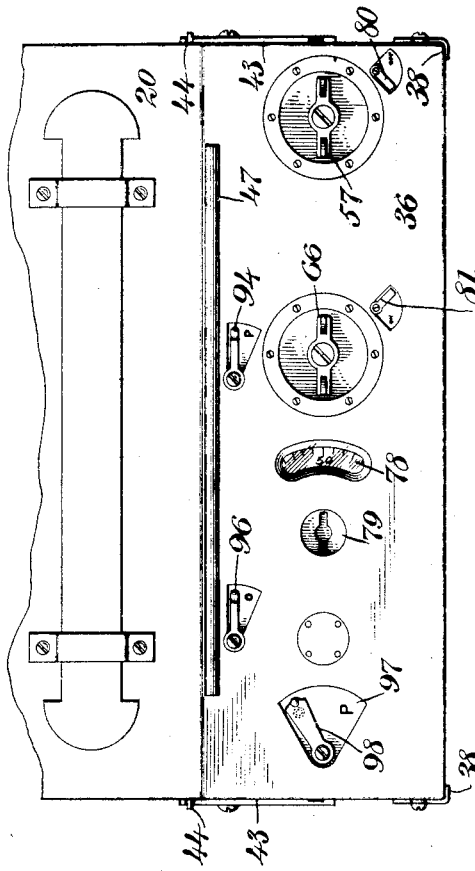
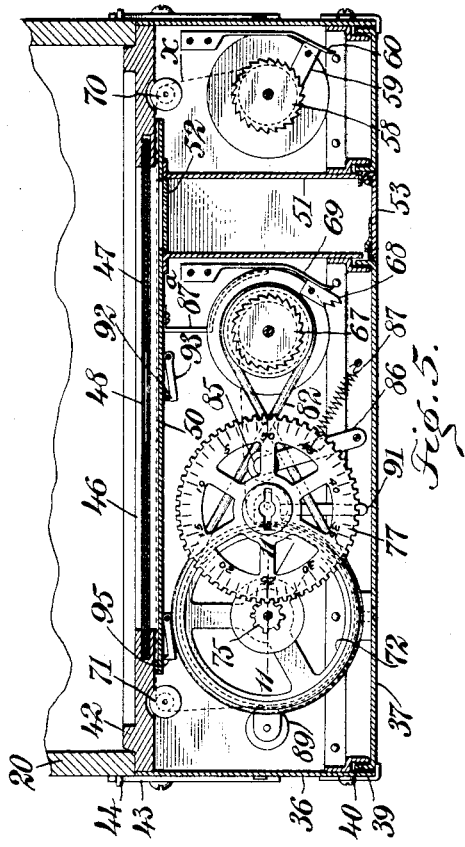
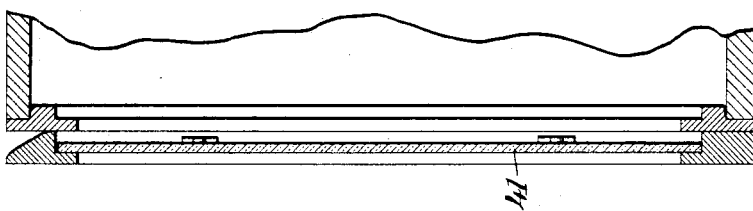

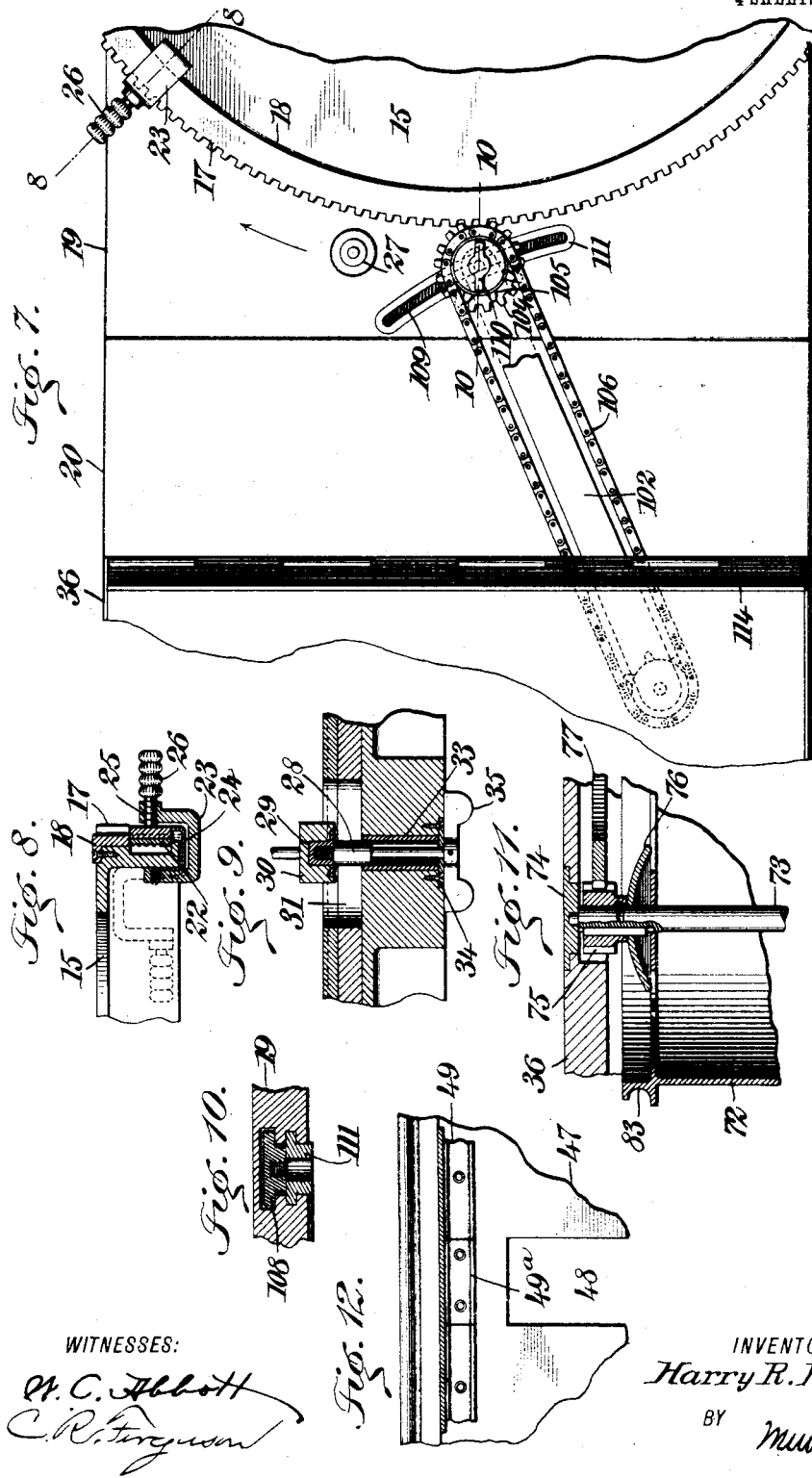

UNITED STATES PATENT OFFICE.

HARRY R. KIESSIG, OF SACRAMENTO, CALIFORNIA.

PANORAMIC ATTACHMEMT FOR PHOTOGRAPHIC CAMERAS.

SPECIFICATION forming part of Letters Patent No. 792,423, dated June 13, 1905.

Application filed November 21, 1904. Serial No. 233,660.

*To all whom it may concern:*

Be it known that I, HARRY R. KIESSIG, a citizen of the United States, and a resident of Sacramento, in the county of Sacramento and State of California, have invented a new and Improved Panoramic Attachment for Photographic Cameras, of which the following is a full, clear, and exact description.

This invention relates particularly to improvements in attachments for photographic cameras for taking panoramic views, the object being to provide a device of this character that may be readily attached to the ordinary forms of detachable-back cameras and with which the scope or composition of the picture may be predetermined, the device being so arranged as to permit exposures for ordinary pictures when desired.

I will describe a panoramic attachment for photographic cameras embodying my invention and then point out the novel features in the appended claims.

Reference is to be had to the accompanying drawings, forming a part of this specification, in which similar characters of reference indicate corresponding parts in all the views.

Figure 1 is a perspective view of a camera embodying my invention. Fig. 2 is a sectional view of the attachment, taken on the line 2 2 of Fig. 3. Fig. 3 is a section on the line 3 3 of Fig. 2. Fig. 4 is a top plan. Fig. 5 is a section on the line 5 5 of Fig. 2. Fig. 6 is a sectional view indicating the usual ground-glass back of a camera. Fig. 7 is a bottom plan of a portion of the tripod-head and camera bed-board. Fig. 8 is a section on the line 8 8 of Fig. 7. Fig. 9 is a section on the line 9 9 of Fig. 1. Fig. 10 is a section on the line 10 10 of Fig. 7. Fig. 11 is a section on the line 11 11 of Fig. 5; and Fig. 12 is a fragmentary view, partly in section, on the line 12 12 of Fig. 3.

Referring to the drawings, 15 designates the tripod-head, removably mounted on legs 16 in the usual manner. Secured to the periphery of the tripod-head is a circular rack 17, the purpose of which will be hereinafter described, and extending around the edge on the top of the tripod-head is a track 18, on which the bed-board 19 of the camera 20 may rotate. This track 18 and the rack 17 may be formed in one piece. On the top of the tripod-head is a spirit-level 21, and movable around the periphery of the head below the rack 17 is a scale-band 22, which is marked off to indicate the number of inches of film that will be necessary for a panoramic view, as will be hereinafter described. Secured to the scale-band so as to move therewith is a clamp 23. This clamp, as clearly indicated in Fig. 8, is not connected directly to the band, but is pivotally connected to the inner end of a spring-plate 24, the outer end of said spring-plate being secured to the band. By this arrangement the clamp may be moved outward for clamping purposes when panoramic views are to be made, or when it is not desired to clamp the parts the said clamp may be turned inward, as indicated in dotted lines in Fig. 8. A clamping-bolt 25 extends through one member of the clamp, and the finger-piece 26 of the bolt is preferably covered with a soft material—such, for instance, as rubber—as this finger-piece is designed to come in contact with an abutment 27, extended downward from the under side of the bed-board 19, and this abutment will also be provided with a ring of rubber or the like. By this cushioning of the parts 26 and 27 there will be little or no shock or vibration when the parts come together.

The camara 20 is preferably secured to the tripod-head by means of a central bolt 28, which passes through an opening in the head and has a threaded portion for engaging in a threaded nut 29, secured to the cross-bar 30, on which the lens-casing is supported in the usual manner. The bed 19 is provided with a slot 31, through which the bolt 28 passes. This is to provide for a slight back-and-forth movement of the camera relative to the center of the tripod-head and optical center of the lens when the same is necessary for focusing. The bolt 28 has an enlarged portion which has a bearing in a sleeve 33, secured in the tripod-head, and the reduced portion of the bolt has a bearing in a plate 34, secured to the head, and the lower end of the bolt is provided with a finger-bar 35.

The attachment which comprises the main feature of my invention consists of a casing 36, having a removable back wall 37, which is held closely in position in any desired manner. I have here shown for this purpose hooks 38, which are mounted to swing on the casing 36 and to engage against the rear side of said back wall 37. To prevent any possibility of the entrance of light around the edges of the back wall, the said edges are turned inward, as indicated at 39 in Fig. 5, so as to engage in channels 40, formed around the back edge of the casing. This casing is designed to be connected to the rear side of the camera-frame 20 after removing the ordinary ground-glass back 41. The front side of the casing has a rib 42 extended around it, and the outer side of this rib is slightly beveled, as indicated in Fig. 5, so that it may be forced tightly into connection with the part 20 of the camera. For holding the parts together I employ hooks 43, mounted to swing on the casing 36 and engage with pins 44 on the camera-frame 20. These hooks are somewhat cam-shaped, so as they are turned in engagement with the pins the casing will be drawn into tight engagement with the camera-frame and the hooks may be held as adjusted by engaging their handle portions with curved racks 45 on the opposite sides of the casing 36. The front wall of the casing 36 has an opening 46, the opposite side walls of which are provided with channels for receiving a dead slide or for receiving a panoramic slide 47. This panoramic slide 47 has a central vertical exposure-slot 48, which in practice will be about one inch (1") wide, and to prevent the entrance of light when a slide is removed, which slide, of course, is passed through a slot in the casing in the usual manner I provide a spring-pressed shutter 49, which when the slide is removed will pass across the outwardly-opening slot. This shutter 49, as clearly shown in Fig. 12, consists of three sections, the short middle section 49ª being designed to pass through the slot 48 as the slide 47 is drawn out or inserted. Rearward of the opening 46 is a plate 50, which will prevent the entrance of light passing through an exposed portion of a film and striking the pictured portion wound up within the casing. Extended from the front to the rear of the casing near the top is a sight-tube 51, the forward end of which is provided with a ruby sight-glass 52, and at the rear end is a door 53. This is for the purpose of observing the numbers on the black-paper backing of the films, indicating the number of exposures. Removably arranged in the casing is a film-delivery spool 54 and a take-up spool 55. The upper end of the spool 54 removably engages with a stud 56, having wings at its lower end in the usual manner, so as to engage in correspondingly-shaped openings in the upper end of the spool-casing, the spool to rotate with the stud. This stud 56 extends through a bearing-plate on the top of the casing and is provided with a cross-bar or finger-piece 57. Attached to the stud 56 is a ratchet-wheel 58, designed to be engaged at a certain time by a pawl 59, mounted to swing in the casing and held yieldingly in position by means of a spring 60—that is, it is held yieldingly in engagement with the ratchet-wheel or is held yieldingly out of engagement with the same when the spool is to turn freely. The lower end of the spool 54 is engaged with a hollow bearing 61, which is movable vertically in a sleeve 62, attached to the bottom wall of the casing. Arranged within the bearing 61 is a spring 63, which at the lower end engages with a pin 64, extended through slots in the bearing 61 and connecting with the sleeve 62. By this arrangement when a spool is to be inserted or removed it can be forced downward to disengage it from the stud 56 and then lifted out. The upper end of the take-up spool 55 removably engages with a stud 65, extended through the top wall of the casing and having a finger-bar 66, the connection between this stud 65 and the spool 55 being similar to the connection of the stud 56 with its spool 54, and the lower end has an antifriction-bearing on the part 61. Attached to the stud 65 is a ratchet-wheel 67, designed to be engaged at a certain time by a pawl 68, held yieldingly by a spring 69. By means of these pawls and the ratchet-wheels one of the spools may be turned to tighten the film, while the other spool remains stationary—that is, as indicated in Fig. 5, the spool 55 being in engagement with the ratchet-wheel 58 will hold the spool 54 from rotary motion while the spool 55 is being turned to tighten the film, the pawl 68 being at this time out of engagement with the ratchet-wheel. The film (indicated at x) passes from the feed-spool 54 to the take-up spool 55, around vertical guide-rollers 70 71, arranged at the ends of the plate 50, over the front surface of which the film extends. It is necessary in taking a panoramic picture that the film shall proceed in a straight line across the slot 48 in order that the picture may not be distorted. Therefore to prevent the film from moving up and down on the guide-rollers the said rollers have enlarged end portions which are beveled at the inner side, as clearly indicated at 71ª in Figs. 2 and 3. The film will lie flat on the rollers, just engaging the inner ends of said bevels, and the black backing-paper being wider than the film rides on the bevels. The foregoing refers to that class of "daylight-cartridge" which has the light-proof cover at both ends only. In case a film is used backed with black paper its entire length it will of course ride with the black paper on the bevels.

Arranged between the guide-rollers 71 and the take-up spool 55 is what I term a "carrying-roller" 72, which is mounted on a vertical shaft 73 in such manner that it may rotate with the shaft or rotate on the shaft. The upper end of the shaft 73 has a bearing in a plate 74, secured in the top wall of the casing 36, (see Fig. 11,) and on the upper end of the shaft is keyed a pinion 75, and also keyed to the shaft and attached to the pinion is a spring washer or plate 76, designed to engage frictionally with the spider-like upper end of the roller 72. This pinion 75 meshes with the teeth of a registering-wheel 77, which has a numbered scale on its upper side, the said numbers being observable through a ruby sight-glass 78, seated in an arc-shaped opening in the top wall of the casing. The stud 79, to which the wheel 77 is attached, extends through an opening in the top wall of the casing and is provided with a slot to receive a key for the purpose of rotating the said wheel to turn it back in its register. The friction-plate 76 will permit of such forcible rotating of the registering-wheel while the roller 72 and the take-up roller are held stationary.

The spindle on which the pawl 59 is mounted extends through the top wall of the casing and is provided with a finger-piece 80, while the spindle of the pawl 68 is provided at its upper end with a finger-piece 81. These finger-pieces are seated in recesses, and in the recesses are letters or words indicating the positions in which the finger-pieces should be to indicate whether the pawls are in engagement with the ratchet-wheels or disengaged therefrom.

Motion is imparted to the spool 55 from the roller 72 through the medium of a crossed belt 82, which engages in an annular channel 83 at the upper end of the roller 72 and in a similar channel 84 at the upper end of the spool 55. The proper tension is given to the belt by means of an idler-roller 85, mounted on a swinging arm 86, and the roller is held yieldingly against a stretch of the belt by means of a spring 87, connected at one end with said lever 86 and at the other end with the casing.

To prevent the film and paper from springing away from the spool 55 while winding thereon, I employ guards, consisting of spring-fingers 87ª, which are connected to the casing at one end and have their free ends turned around said spool.

At the opposite sides of the roller 72 are friction-rollers 88 89. These rollers at their upper and lower ends have bearings in curved spring-plates 90, which at their central portions are secured to the wall 37, so that said friction-rollers may be removed with said wall. This greatly facilitates the threading of the film when loading the device. These friction-rollers 88 89 are designed to keep the film in firm contact with the feeding-roller or with the carrying-roller 72.

Mounted on the members of the arms or plates 90, to which the roller 88 is connected, are stop-bars 91, which by engaging with the rear wall of the casing will prevent the roller 88 from springing too far outward. To indicate when the end of a panoramic picture shall have been reached, I provide a device for puncturing the film should it be desired to cut off the same from the main body of the film for the purpose of developing. This puncturing device consists of a pin 92, movable through a slot in the plate or partition 50 and carried by an arm 93, supported on a spindle which passes up through the top of the casing 36 and is provided with a shifting-arm 94 on the top of the casing, this arm being arranged in a recess, and in the opposite side of the recess an indicating-mark may be placed to show the position the pin should be in when out of engagement with the film or after puncturing the same. A similar puncturing device 95 is provided for piercing the film when an ordinary picture is taken—that is, when the picture fills the whole space of the opening 48. This puncturing device 95 has on the upper end of its spindle a manipulating finger-piece 96, which is also seated in a recess formed in the top of the casing. In the top of the casing is a recess 97, in which an indicator 98 is mounted to swing. At one side of the recess is the letter "O," and at the opposite side is the letter "P." After finishing a panoramic picture the indicator 98 is to be moved over the letter "P" to indicate that the last picture taken was of a panoramic type. Of course after finishing the panoramic picture the lens-shutter is to be closed, the slotted slide removed, and a solid slide substituted therefor.

The shaft 73 extends through the bottom wall of the casing 36 and engages in a step-bearing 99, attached to the bottom wall of a gearing-chamber 100. The shaft passes through a sleeve 101 on the under side of the bottom wall of the casing, and mounted to rotate on this sleeve is an arm 102, which at its free end carries a shaft 103, upon which is mounted a pinion 104, designed to be engaged with the rack 17. On the spindle 103 is a sprocket-wheel 105, from which a sprocket-chain 106 passes to engagement with a sprocket-wheel 107 on the shaft 73. The spindle 103 is hollow, so that a pivot-bolt may pass through the same and engage in a nut 108, mounted to slide in an arc slot 109, formed in the bed-board 19. By this means the pinion 105 may be adjusted to compensate for inward or outward movements of the rack 17, caused by focusing or, in other words, caused by movements inward and outward of the lens-carrying plate, as heretofore mentioned. When in proper position, the arm is clamped by means of a screw-shaft 110, which engages with the nut 108. As clearly shown in the drawings, the arc slot 109 has metallic walls 111.

For convenience in turning the camera and the attachment relatively to the tripod-head I provide a handle which, as here shown, consists of a wire 112, mounted to slide in guides 113, secured to the under side of the bottom wall of said casing 36. This handle may be slid completely into the attachment when not in use and held by any desired means.

In the operation after setting up and leveling the tripod the camera, with the ground-glass back attached, is to be placed on the head and engaged by the pivot-screw 28, and the stop-stud 27 is to be placed in position. Having decided on the desired angle of view or field, the shutter of the lens is to be opened and the operator will observe the field through the ground glass and swing the camera to the left, so that a line drawn on the ground glass corresponding to the right-hand wall of the opening 48 will mark the left-hand limit of the field. There are two such lines on the ground glass, the space between the lines being equal to the width of the opening 48. After this movement of the camera the clamp 23, carrying the band 22, is turned to the left until the finger-piece 26 comes in contact with the stud 27. The clamp is then to be secured by turning inward the screw 25. The camera now being adjusted correctly and at right-hand limit of field, the position of the stop-stud 27 in relation to the scale 22 is to be noticed. If it is at "35," for instance, it means that it will require thirty-five inches of film to take the picture. The clamp is placed on the band at the zero-point, and the operator can therefore act according to the amount of the film he has on the roll. The camera now being in correct position to take the picture, the ground-glass back is taken off and the panoramic attachment put in place and fastened with the hooks 43. The door 114 of the chamber 100 is to be opened so that the arm 102, carrying the gear mechanism, can be swung outward to engage the pinion 104 with the rack 17. The lens-shutter must now be closed and the solid slide removed and replaced by a slotted slide, after which the lens-shutter is again removed and the camera rotated around the tripod-head, and obviously through the gear mechanism the rollers will be operated to move the film across the opening 48. The picture now having been completed, the lens-shutter is closed, the slotted slide removed and replaced by a solid slide, and the film is punctured by the point 92 to mark the place for cutting off, if it is desired to develop each exposure separately.

Having thus described my invention, I claim as new and desire to secure by Letters Patent—

1. In a panoramic camera, a tripod-head, a circular rack on said head, a scale-band movable around the periphery of said head, a clamping device for said band, a camera mounted to rotate on the head, a stop on the camera for engaging with said clamp, a film-holder mounted on the camera, and means operated from said circular rack for causing the movement of the film.

2. In a panoramic camera, a tripod-head, a circular rack on the head, a scale-band movable on the periphery of the head, a clamping device secured to said band, a stop-stud on the bottom of the camera for engaging with said clamping device, a film-holder casing removably mounted on the camera, film-supporting spools in the casing, a film-feeding roller in the casing, an arm mounted to swing relatively to the shaft of said roller, a pinion carried by said arm for engaging with said rack, and a driving connection between said pinion and the roller-shaft.

3. In a panoramic camera, a tripod-head, a camera having a slot in its bed-board, a pivot-pin extended through the head and through said slot and engaging with a support for the lens-frame, a film-holder removably mounted on the camera, and means actuated by rotary movements of the camera on the head for causing the movement of the film in the film-holder.

4. The combination with a tripod-head, of a scale-band mounted to rotate on the periphery thereof, a spring-plate secured to said band, and a clamping device having swinging connection with the spring-plate.

5. The combination with a camera, of a film-holding casing adapted for connection with the rear side of the camera-frame, cam-hooks mounted on the casing, pins on the camera-frame for engaging with said hooks, and film-supporting devices in the casing.

6. A panoramic attachment for a camera, comprising a casing, having an opening at the front, a vertically-slotted slide movable into and out of said opening, a film-supply spool mounted in the casing, a take-up spool mounted in the casing, a carrying-roller adjacent to the take-up spool, friction-rollers at the opposite sides of said carrying-roller, and means for rotating the carrying-roller.

7. A panoramic attachment for a camera comprising a casing, a film-supply spool mounted in the casing, a film-receiving spool mounted in the casing, means for causing lengthwise movement of the film, and guide-rollers for the film having enlarged tapered ends.

8. In a film-holder for panoramic cameras, the guide-rollers having enlarged ends tapered at the inner side.

9. A panoramic attachment for a camera, comprising a film-supply spool removably arranged in the casing, a ratchet-wheel adapted to be carried with said spool, a pawl for engaging with said ratchet-wheel, means operated from the outer side of the casing for causing movements of said pawl, a take-up spool removably placed in the casing, a ratchet-and-pawl mechanism therefor, a carrying-roller, and a driving connection between said carrying-roller and the take-up spool.

10. A panoramic attachment for a camera comprising a casing, a film-supply spool mounted in the casing, a film take-up spool mounted in the casing, a carrying-roller, a pinion having yielding connection with said carrying-roller, and a registering-wheel having toothed connection with said pinion.

11. An attachment for a camera comprising a casing having a channel around its rear side, a rear wall having a flange extended around it for passing into said channel, the front of said casing being open, and a bead extended around said opening, the said bead being beveled on its outer edge for engaging with the frame of a camera.

12. An attachment for a camera comprising a casing, film-supports in the casing, means for causing the movement of said supports, and two independent puncturing devices for puncturing the film.

13. An attachment for a camera comprising a casing having an open front, a slotted slide for said opening, a partition rearward of the opening, and two independent puncturing devices mounted to swing in the casing, and operated from the outer side thereof.

14. An attachment for a camera comprising a casing, a film-delivery spool arranged in the casing, a take-up spool arranged in the casing, a carrying-roller in the casing, spring-pressed rollers at opposite sides of said carrying-roller, stop devices for one of said spring-pressed rollers, a crossed-belt connection between said carrying-roller and the take-up or receiving spool, and a tension device for said belt.

15. A camera attachment comprising a casing having an open front, a tube extended through said casing and opening outward at the back, a door for said outward opening, a sight-glass arranged in the forward end of the tube, and film-carrying devices in the casing.

16. The combination with a tripod-head, of a rack engaging around the head, a camera having an arc slot in its bed-board, a nut adjustable in said slot, a casing adapted to be engaged with the camera, film-supply and take-up spools in said casing, a carrying-roller in the casing, an arm mounted to swing in the casing, a pinion carried by the free end of said arm, means for engaging said pinion with said nut, the said pinion being designed to engage with said rack, means for adjusting the camera outward and inward on the head, and driving connection between said pinion and the shaft of the carrying-roller.

17. A camera tripod-head, a circular rack on said head, a scale-band movable around said head, and a clamping device carried by the band.

18. A camera attachment comprising a casing having a gear-chamber at its lower portion, supply and take-up spools in said casing, a carrying-roller in the casing, a shaft on which said roller is mounted, the said shaft being extended into said chamber, an arm arranged in the chamber and mounted to swing relatively to the shaft, a sprocket-wheel on said shaft, a spindle carried by the free end of the arm, a pinion on said spindle, a sprocket-wheel on said spindle, and a sprocket-chain connection between the two sprocket-wheels.

19. An attachment for a camera comprising a casing open at the front, a slotted slide for said opening, the said casing being provided with an outwardly-opening slot through which said slide may pass, and a spring-pressed shutter for said slot the said shutter having a portion for passing into the slot of the slide.

In testimony whereof I have signed my name to this specification in the presence of subscribing witnesses.

HARRY R. KIESSIG.

Witnesses:
 CHARLES K. PENNER,
 JAMES E. O'CONNOR,
 J. FRANK BROWN.